United States Patent [19] [11] 3,808,528
Nugent et al. [45] Apr. 30, 1974

[54] MODULATION AND NOISE ANALYZER

[75] Inventors: John L. Nugent, Baltimore; Harry W. Claypool, Joppa, both of Md.

[73] Assignee: Westinghouse Electric Corporation, Pittsburgh, Pa.

[22] Filed: Sept. 25, 1972

[21] Appl. No.: 292,242

[52] U.S. Cl. .................... 324/77 R
[51] Int. Cl. .................... G01r 23/16
[58] Field of Search .................... 324/77 R, 77 B, 82

[56] References Cited

UNITED STATES PATENTS 3,649,909 3/1972 Ort et al. .................... 324/82

FOREIGN PATENTS OR APPLICATIONS 894,003 4/1962 Great Britain .................... 324/77 R

OTHER PUBLICATIONS

Bredall, Tele-Tech, Dec. 1950, pp. 37–40.

*Primary Examiner*—Alfred E. Smith
*Attorney, Agent, or Firm*—J. B. Hinson

[57] ABSTRACT

A system for analyzing an RF signal to determine the noise and modulation components of the signal is disclosed there. The system is capable of analyzing an unknown signal to determine the random AM, FM and PM noise components as well as the intentional AM, FM and PM modulation components. The system includes a phase lock loop through which controls the frequency of a signal which is mixed with the signal to be analyzed such that the resulting signal is within a frequency band which can be easily analyzed.

10 Claims, 1 Drawing Figure

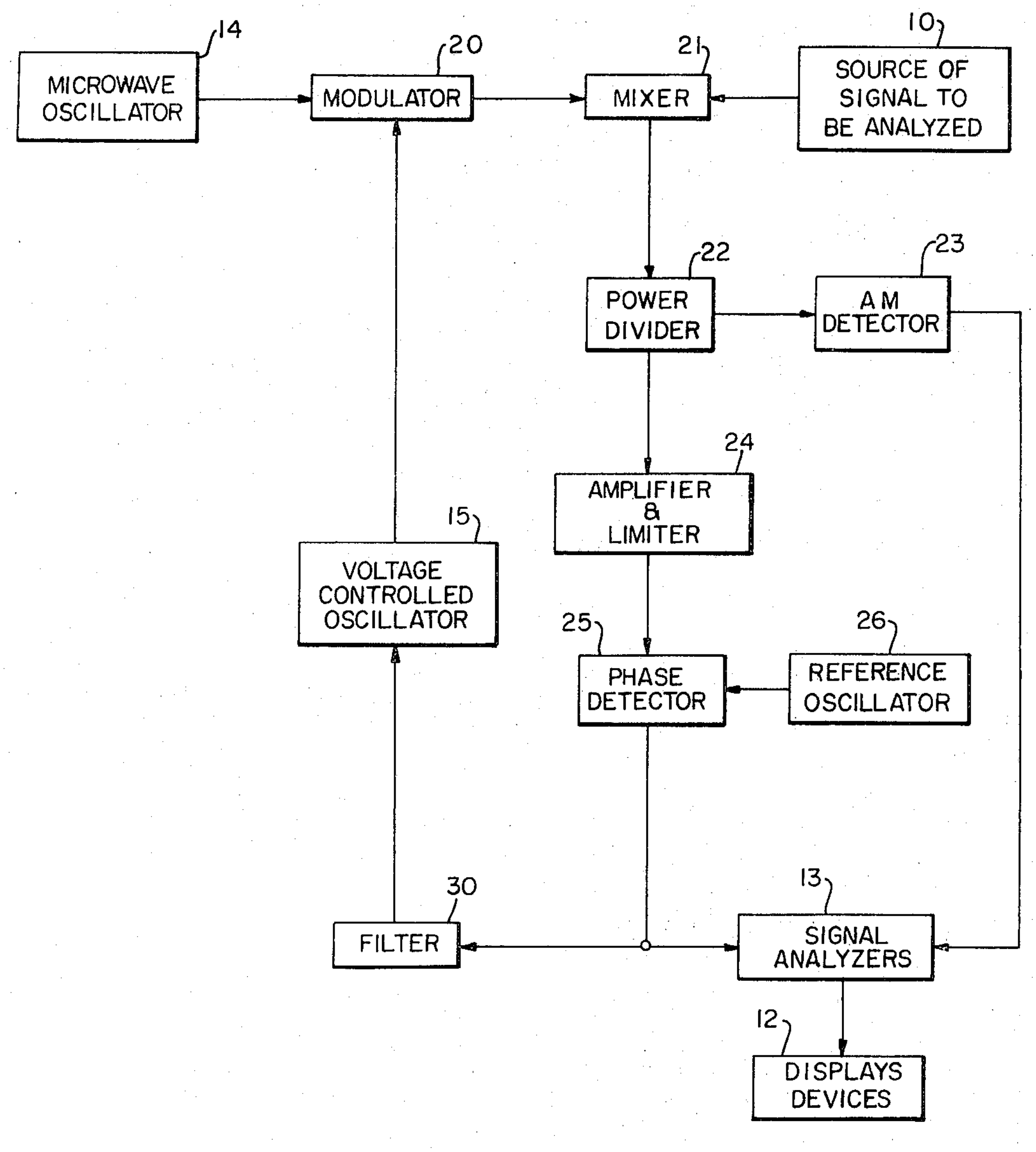
14
MICROWAVE OSCILLATOR
20
MODULATOR
21
MIXER
10
SOURCE OF SIGNAL TO BE ANALYZED
22
POWER DIVIDER
23
A M DETECTOR
24
AMPLIFIER & LIMITER
15
VOLTAGE CONTROLLED OSCILLATOR
25
PHASE DETECTOR
26
REFERENCE OSCILLATOR
30
FILTER
13
SIGNAL ANALYZERS
12
DISPLAYS DEVICES

MODULATION AND NOISE ANALYZER

BACKGROUND OF THE INVENTION

Field of the Invention

The invention relates to signal analyzers and more particularly to analyzers incorporating a feedback loop which automatically tells the analyzer to compensate for variations in the signal being analyzed.

SUMMARY OF THE INVENTION

In the disclosed system, the output signal of a VHF voltage controlled oscillator is combined with the output of a microwave oscillator in a signal sideband modulator to generate a microwave signal which is sidestepped from the frequency of the microwave oscillator. The output of the single sideband modulator and the signal to be analyzed is combined in a mixer to generate a new RF signal. This signal is coupled to a power divider with one portion of the signal being coupled to an AM detector for AM modulation checks. The second portion is amplified and limited and coupled to the input of a phase detector. The output of the phase detector is coupled to signal analyzers for determining the FM and PM modulation and noise components of the signal and through a filter to generate a control signal which determines the frequency of the voltage controlled VHF oscillator. This arrangement permits the frequency of the output signal of the mixer to be stabilized so that modulation measurements on the signal to be analyzed can be continuously and conveniently made although the frequency of this signal or the frequency of the microwave oscillator may experience substantial frequency drift.

DESCRIPTION OF THE DRAWINGS

The single FIGURE is a block diagram of the system.

DETAILED DESCRIPTION

The single FIGURE is a functional block diagram illustrating the preferred embodiment of the analyzer which is the subject of this invention. The analyzer is designed to accept signals from a source 10, analyzing these signals to determine the modulation and noise components and displaying the results of this analysis on display devices 12. In a typical situation, the source of the signal to be analyzed 10 will generate a microwave signal which will be FM, PM or AM modulated at one or more frequencies. Signals including these modulation components will be coupled to and analyzed by the signal analyzers 13 and the display devices 12 will indicate the frequency at which the signal from the source 10 is modulated and the index of modulation. The signal to be analyzed may be amplitude modulated, frequency modulated or phase modulated or a combination of these types of modulation. Alternatively, the signal to be analyzed may be frequency modulated to generate one or more subcarrier with the subcarriers in turn being modulated. In either case, a signal containing all the modulation components will be applied to the input of the signal analyzer 13 and signals indicative of the modulation will be displayed on the display devices 12.

The signal analyzer 13 and the display devices 12 may be commercially available devices or may be assembled from a combination of commercially available analyzers and display devices.

The details of the signal analyzers and the display devices will depend on the expected modulation and noise components of the signal to be analyzed.

In the preferred embodiment of the invention illustrated in the FIGURE, the output signal of a microwave oscillator 14 is combined with the output of a voltage controlled oscillator 15 and a modulator 20. The output of the modulator 20 is in turn combined with the signals to be analyzed in a mixer 21. The modulator 20 is preferably a single sideband modulator and includes controls so that either the lower or upper sideband can be selected. Utilizing a single sideband modulator greatly reduces the intermodulation component, which may be introduced in the remainder of the system if unwanted frequencies appear at the output of the modulator 20.

The output signal of the mixer 21 is coupled to a power divider 22. The power divider 22 divides the output signal of the mixer 21 into two parts with the first part being coupled to an amplitude modulation detector 23 and the second part coupled to an amplifier and limiter circuit 24. The signal coupled to the AM detector 23 includes all the amplitude modulation components of the signal to be analyzed. The output of the AM detector 23 is in turn coupled to the signal analyzers 13. The signal analyzers 13, analyze this signal to determine the AM modulation and noise components of the output signal of the signal source 10. Typically, the signal to be analyzed will contain both intentional amplitude modulation and amplitude modulation in the form of unwanted noise. These signals can be individually or collectively analyzed as to amplitude and degree of modulation by signal analyzers 13. The display devices 12 are selected to display the results of this analysis in the desired form.

The portion of the signal coupled by the power divider 22 to the amplifier and limiter and amplifier circuit 22 is amplified and limited by this circuit to eliminate the amplitude modulation components. The output of the amplifier and limiter circuit 24 is coupled to a phase detector 25 where it is combined with the output signal of a reference oscillator 26 to generate a signal which includes both the phase and frequency modulation components of the signal to be analyzed.

The output of the phase detector 25 is coupled to the input of a filter circuit 30. The filter circuit 30 filters the output signal of the phase detector 25 to remove the modulation components of this signal to produce a signal for controlling the voltage controlled oscillator 15. The magnitude of this signal is indicative of the change in the carrier frequency of the signal being analyzed. This signal may be displayed on a display (not shown) if this parameter is of interest. The filter circuit 30 and the voltage controlled oscillator 15 are designed such that the frequency of the output signal of the mixer 21 is maintained at a frequency which is within the bandpass of the power divider and the amplifier and limiter circuit for a relatively wide change in frequency in the signals to be analyzed and the output signal of the microwave oscillator 14. This permits signals having a relatively wide frequency range to be conveniently analyzed for noise and modulation components.

What is claimed is:

1. An analyzer for determining the noise and modulation components of an RF carrier comprising in combination:

a. a first reference oscillator for generating a first microwave signal;

b. a second voltage controlled oscillator for generating a first VHF signal;

c. means for combining said first microwave signal with said first VHF signal to generate a second microwave signal having a predetermined frequency relationship to said first microwave and VHF signals;

d. means for combining said second microwave signal with a third microwave signal to produce a second VHF signal, said third microwave signal being a signal whose noise and modulation components are to be determined;

e. means for generating a third VHF signal;

f. means for combining said second VHF signal with a third VHF signal to produce a fourth signal; and g. means responsive to said fourth signal to generate a voltage signal, said voltage signal being coupled to said first VHF oscillator such that the frequency of said first oscillator is controlled such that the frequency components of said second VHF signal are within a predetermined frequency band and have a predetermined relationship to the carrier and modulation components of said third microwave signal.

2. An analyzer in accordance with claim 1 wherein said means for combining said first microwave signal with said first VHF signal in a single sideband modulator.

3. An analyzer in accordance with claim 2 further including means for selecting the sideband to be used as an output signal.

4. An analyzer in accordance with claim 1 wherein said means for combining said second microwave signal with said third microwave signal comprises a microwave mixer.

5. An analyzer in accordance with claim 4 further including power dividing means coupled to the output of said microwave mixer with at least one output terminal of said microwave power divider being coupled to an AM detector.

6. An analyzer in accordance with claim 3 wherein said means for combining said second VHF signal with a third VHF signal is a phase detector.

7. An analyzer in accordance with claim 6 further including filter and signal analyzing means coupled to the output of said phase detector.

8. An analyzer in accordance with claim 7 wherein the output of said filter is coupled to the input terminal of said voltage controlled oscillator.

9. An analyzer in accordance with claim 8 wherein said signal analyzer means includes means for analyzing a carrier which is modulated with a plurality of subcarriers.

10. An analyzer in accordance with claim 9 wherein sais signal analyzing means includes means for individually analyzing the modulation components of said plurality of subcarriers.

* * * * *